US010055312B2

(12) United States Patent
Papadomitsos et al.

(10) Patent No.: US 10,055,312 B2
(45) Date of Patent: Aug. 21, 2018

(54) DATA FORWARDER PRIORITIZING LIVE DATA

(71) Applicant: SPLUNK INC., San Francisco, CA (US)

(72) Inventors: Panagiotis Papadomitsos, San Francisco, CA (US); Ioannis Vlachogiannis, San Francisco, CA (US)

(73) Assignee: SPLUNK INC., San Francisco, CA (US)

( * ) Notice: Subject to any disclaimer, the term of this patent is extended or adjusted under 35 U.S.C. 154(b) by 0 days.

(21) Appl. No.: 15/665,001

(22) Filed: Jul. 31, 2017

(65) Prior Publication Data
US 2017/0357554 A1  Dec. 14, 2017

Related U.S. Application Data

(63) Continuation of application No. 14/530,445, filed on Oct. 31, 2014, now Pat. No. 9,753,818.

(60) Provisional application No. 62/053,101, filed on Sep. 19, 2014.

(51) Int. Cl.
*G06F 11/14*   (2006.01)
*H04L 1/16*   (2006.01)

(52) U.S. Cl.
CPC ...... *G06F 11/1469* (2013.01); *G06F 11/1466* (2013.01); *H04L 1/16* (2013.01); *G06F 2201/84* (2013.01)

(58) Field of Classification Search
CPC .............................. G06F 11/14; G06F 11/1469
USPC ......................................................... 714/15
See application file for complete search history.

(56) References Cited

U.S. PATENT DOCUMENTS

| | | |
|---|---|---|
| 6,496,908 B1 | 12/2002 | Kamvysselis et al. |
| 6,782,410 B1 | 8/2004 | Bhagat et al. |
| 7,346,805 B1 | 3/2008 | Scharland et al. |
| 7,519,870 B1 | 4/2009 | Sim-Tang |
| 7,558,928 B1 * | 7/2009 | DeVos ................ G06F 11/1451 707/999.202 |
| 7,970,949 B2 | 6/2011 | Pope et al. |

(Continued)

OTHER PUBLICATIONS

Vlachogiannis, Jon, "BigData Using Erlang, C and Lisp to Fight the Tsunami of Mobile Data", High Scalability, dated Nov. 26, 2012, 8 pages.

(Continued)

*Primary Examiner* — Kamini B Patel
(74) *Attorney, Agent, or Firm* — Shook Hardy & Bacon L.L.P.

(57) ABSTRACT

In accordance with implementations of the present disclosure, a backup of live data received by a data forwarder is generated at the data forwarder while the live data is provided to a real-time data pipeline for forwarding from the data forwarder. A a first portion of the live data is recovered from the backup to a stale data pipeline of the data forwarder. A request to forward the live data to a destination node is received by the data forwarder. In response to the request data is forwarded to the destination node, where the first portion of the live data from the stale data pipeline is added to a second portion of the live data from the real-time data pipeline in the response based on determining headroom remains to reach an amount of the data identified to include in the response.

30 Claims, 4 Drawing Sheets

(56) References Cited

U.S. PATENT DOCUMENTS

| | | | |
|---|---|---|---|
| 8,335,969 B2* | 12/2012 | Gubbi | H03M 13/1515 370/392 |
| 8,429,482 B1* | 4/2013 | Payne | H04L 1/005 714/751 |
| 8,484,242 B1 | 7/2013 | Singh et al. | |
| 8,825,937 B2* | 9/2014 | Atkisson | G06F 12/0246 711/102 |
| 8,898,520 B1 | 11/2014 | Ford et al. | |
| 8,977,595 B1 | 3/2015 | Leonard | |
| 2001/0047390 A1 | 11/2001 | McGann et al. | |
| 2002/0016827 A1 | 2/2002 | McCabe et al. | |
| 2002/0052909 A1 | 5/2002 | Seeds | |
| 2002/0165864 A1 | 11/2002 | Azagury et al. | |
| 2003/0009553 A1 | 1/2003 | Benfield et al. | |
| 2003/0018483 A1 | 1/2003 | Pickover et al. | |
| 2003/0126387 A1 | 7/2003 | Watanabe | |
| 2003/0158847 A1 | 8/2003 | Wissner et al. | |
| 2004/0003069 A1* | 1/2004 | Wong | H04L 47/10 709/223 |
| 2004/0024771 A1 | 2/2004 | Jain et al. | |
| 2004/0133622 A1 | 7/2004 | Clubb et al. | |
| 2004/0163115 A1* | 8/2004 | Butzer | H04N 7/162 725/88 |
| 2004/0181600 A1 | 9/2004 | Yamagami | |
| 2005/0010753 A1 | 1/2005 | Marceau et al. | |
| 2005/0027892 A1 | 2/2005 | McCabe et al. | |
| 2005/0071527 A1 | 3/2005 | Cordina et al. | |
| 2005/0081080 A1* | 4/2005 | Bender | H04L 41/0668 714/2 |
| 2005/0086359 A1 | 4/2005 | Banerjee et al. | |
| 2005/0114510 A1 | 5/2005 | Error et al. | |
| 2005/0172054 A1 | 8/2005 | Mathrubutham et al. | |
| 2005/0212903 A1 | 9/2005 | Corbett et al. | |
| 2005/0240677 A1* | 10/2005 | Liu | H04L 41/0654 709/231 |
| 2006/0010347 A1* | 1/2006 | Sugihara | G11B 27/36 714/30 |
| 2006/0112114 A1 | 5/2006 | Yu et al. | |
| 2007/0011267 A1 | 1/2007 | Overton et al. | |
| 2007/0162637 A1 | 7/2007 | Mirabeau et al. | |
| 2007/0207793 A1 | 9/2007 | Myer et al. | |
| 2008/0022183 A1* | 1/2008 | Arslan | H04L 1/0045 714/758 |
| 2008/0091491 A1 | 4/2008 | Thorpe et al. | |
| 2008/0091806 A1 | 4/2008 | Shen et al. | |
| 2008/0243845 A1 | 10/2008 | Wouhaybi et al. | |
| 2009/0157641 A1 | 6/2009 | Andersen et al. | |
| 2009/0234908 A1 | 9/2009 | Reyhner et al. | |
| 2010/0017532 A1 | 1/2010 | Bowen | |
| 2010/0050055 A1* | 2/2010 | Tanaka | H04L 1/0045 714/776 |
| 2010/0058012 A1* | 3/2010 | Okada | G06F 11/1456 711/162 |
| 2010/0250748 A1 | 9/2010 | Sivasubramanian et al. | |
| 2010/0281000 A1* | 11/2010 | Lehr | G06F 11/1402 707/675 |
| 2011/0022801 A1* | 1/2011 | Flynn | G06F 9/52 711/120 |
| 2011/0213886 A1 | 9/2011 | Kelkar et al. | |
| 2011/0258391 A1* | 10/2011 | Atkisson | G06F 11/108 711/118 |
| 2012/0066271 A1 | 3/2012 | Chandrasekar et al. | |
| 2012/0124294 A1* | 5/2012 | Atkisson | G06F 11/108 711/135 |
| 2012/0198052 A1 | 8/2012 | Ljung et al. | |
| 2012/0198175 A1* | 8/2012 | Atkisson | G06F 12/0804 711/135 |
| 2012/0210041 A1* | 8/2012 | Flynn | G06F 1/183 711/3 |
| 2012/0215997 A1 | 8/2012 | Stanfill et al. | |
| 2012/0246556 A1 | 9/2012 | Chikirivao et al. | |
| 2012/0278678 A1* | 11/2012 | Kruglick | H04L 1/0056 714/752 |
| 2012/0310427 A1 | 12/2012 | Williams et al. | |
| 2013/0036375 A1 | 2/2013 | Zavatone et al. | |
| 2013/0067179 A1* | 3/2013 | Paleologu | G06F 11/1076 711/159 |
| 2013/0090961 A1 | 4/2013 | Smith | |
| 2013/0103708 A1 | 4/2013 | Kim et al. | |
| 2013/0135997 A1 | 5/2013 | Lee | |
| 2013/0191601 A1* | 7/2013 | Peterson | G06F 12/0868 711/137 |
| 2013/0212267 A1 | 8/2013 | Kern et al. | |
| 2013/0290931 A1 | 10/2013 | Wall et al. | |
| 2013/0332996 A1 | 12/2013 | Fiala et al. | |
| 2014/0040884 A1 | 2/2014 | Donahue | |
| 2014/0046956 A1 | 2/2014 | Zenger et al. | |
| 2014/0047107 A1* | 2/2014 | Maturana | H04L 43/04 709/224 |
| 2014/0068083 A1 | 3/2014 | Tyagi et al. | |
| 2014/0081906 A1 | 3/2014 | Geddam et al. | |
| 2014/0095505 A1 | 4/2014 | Blanchflower et al. | |
| 2014/0156038 A1 | 6/2014 | Poyhtari et al. | |
| 2014/0180826 A1 | 6/2014 | Boal | |
| 2014/0215057 A1 | 7/2014 | Walsh et al. | |
| 2014/0298009 A1 | 10/2014 | Hattori et al. | |
| 2014/0337345 A1 | 11/2014 | Motoyama | |
| 2014/0337442 A1 | 11/2014 | Zhuang et al. | |
| 2015/0019812 A1 | 1/2015 | Ban | |
| 2015/0186064 A1 | 7/2015 | Chen et al. | |
| 2015/0222723 A1 | 8/2015 | Adapalli et al. | |
| 2015/0261455 A1* | 9/2015 | Gough | G06F 11/14 714/6.24 |
| 2015/0261622 A1* | 9/2015 | Vlachogiannis | G06F 17/30221 707/644 |
| 2015/0264002 A1* | 9/2015 | Vlachogiannis | H04L 51/18 709/206 |
| 2015/0264152 A1* | 9/2015 | Vlachogiannis | H04L 67/10 709/213 |
| 2015/0295848 A1 | 10/2015 | Vlachogiannis et al. | |
| 2015/0301861 A1 | 10/2015 | LaChiusa et al. | |
| 2016/0019636 A1 | 1/2016 | Adapalli et al. | |

OTHER PUBLICATIONS

Notice of Allowance dated Sep. 12, 2017 in U.S. Appl. No. 14/699,984, 8 pages.
Notice of Allowance dated Sep. 12, 2017 in U.S. Appl. No. 14/699,992, 8 pages.
Notice of Allowance dated Sep. 8, 2017 in U.S. Appl. No. 14/699,996, 6 pages.

* cited by examiner

DATA FORWARDER PRIORITIZING LIVE DATA

CROSS-REFERENCE TO RELATED APPLICATIONS

This application claims priority to Provisional Application Ser. No. 62/053,101, filed on Sep. 19, 2014 and entitled "DATA FORWARDING USING MULTIPLE DATA PIPELINES." This application claims the benefit of U.S. Nonprovisional application No. 14/530,445, titled "DATA FORWARDING USING MULTIPLE DATA PIPELINES," filed Oct. 31, 2014, which is hereby expressly incorporated by reference in its entirety.

BACKGROUND

Computer networks interconnect network nodes so that a source node can communicate data to one or more destination nodes. In some cases, source and destination network nodes may be directly connected to each other. In other cases, one or more intermediate network nodes may be employed to communicate data between source and destination nodes. For example, a data forwarder may be utilized as an intermediate network node for the source and destination nodes. Transactions received from the source node can be stored to disk by the data forwarder. Any transactions that are sent to the destination node by the data forwarder are subsequently retrieved from the disk. By storing data to and retrieving the data from the disk, the data is persisted allowing for the data forwarder to withstand system instability.

SUMMARY

Embodiments of the present invention are directed to data forwarding. Multiple data pipelines or queues are used to implement network data forwarding. In this regard, one or more live data pipelines or queues can be implemented as in-memory data paths to quickly forward live or real-time data through the data forwarder. Additionally, one or more stale data pipelines or queues can be implemented as stale data paths to forward data as an alternative to the one or more live data pipelines. Live data pipelines may be used as primary conduits for forward data through a data forwarder, while stale data pipelines are used to forward data that is not successfully forwarded through a live data pipeline.

In some respects, transactions can be received at an input interface of an in-memory data path that comprises a live data buffer. The in-memory data path is between the input interface and an output interface of a data forwarder and can correspond to a live data pipeline through the data forwarder. An in-memory data path can be a communication path for data that does not include reading the data from disk based storage, or optionally from any other type of non-volatile storage. The in-memory data path allows for the transactions to be quickly received from a source node by the data forwarder and sent to a destination node from the data forwarder without the substantial costs that are commonly associated with reading all of the transactions from disk or non-volatile storage.

In accordance with aspects of the present disclosure, transactions from the input interface can be stored on non-volatile storage in association with a transaction log. Storing the transactions on the non-volatile storage in this manner can allow at least some of the transactions to be sent to the output interface, through a stale data buffer, from the non-volatile storage over a stale data path. A stale data path can correspond to a stale data pipeline through a data forwarder. It may typically be more desirable to send transactions to the output interface through the in-memory data path of a live data pipeline. However, in some instances it may be desirable to send transactions to the output interface from the non-volatile storage in addition to, or instead of, sending transactions to the output interface through the in-memory data path.

As one example, transactions can be sent from the non-volatile storage to compensate for any of various possible system instabilities, which could compromise the data forwarders ability to send the transactions through the in-memory data path and/or the ability of a destination node to receive the transactions through the in-memory data path. A particular instance of system instability could be a system crash where the transactions are lost by volatile memory. As another example, even where transactions are sent to a destination node through the in-memory data path, it may be desirable for the transactions to be resent, in various instances. Thus, significant flexibility is provided for the sending of transactions.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Implementations of the present disclosure are described in detail below with reference to the attached drawing figures, wherein.

DETAILED DESCRIPTION

Figure 1:
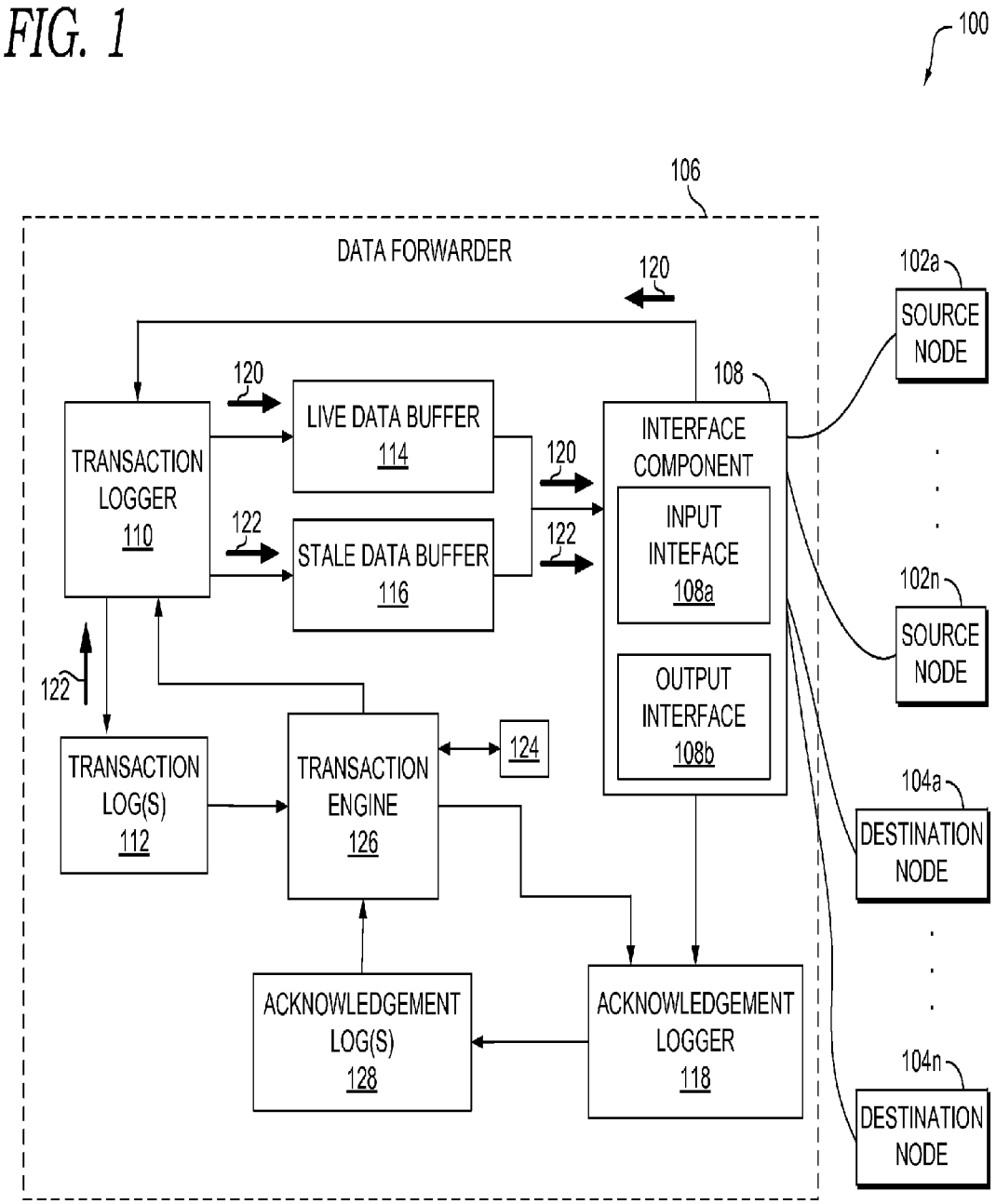
FIG. 1 illustrates an exemplary system which can be utilized for data forwarding in accordance with implementations of the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

In implementing data forwarding using one or more live data pipelines of a data forwarder, situations may arise where real-time or live data cannot successfully be forwarded to a destination node through the one or more live data pipelines. As examples, transactions corresponding to the data may be dropped when a live data buffer of a live data pipeline is being pushed transactions faster than the transactions can be sent through, or transaction data can be lost due to system crashes of the data forwarder or destination node. Aspects of the present disclosure can be implemented so as to successfully forward transactions to a destination node in these and other scenarios.

Embodiments of the present invention are directed to data forwarding. In some respects, transactions can be received at an input interface of an in-memory data path that comprises a live data buffer where the in-memory data path is between the input interface and an output interface of a data forwarder. The in-memory data path can correspond to a live data pipeline and allows for the transactions to be quickly received from a source node by the data forwarder and sent to a destination node from the data forwarder without the substantial costs that are commonly associated with reading all of the transactions from disk or non-volatile storage.

In accordance with aspects of the present disclosure, transactions from the input interface can be stored on non-volatile storage in association with a transaction log. Storing the transactions on the non-volatile storage in this manner can allow for at least some of the transactions to be sent to the output interface, through a stale data buffer, from the non-volatile storage over a stale data path. The stale data path can correspond to a stale data pipeline for forwarding of non-live or non-real-time data. It may typically be more desirable to send transactions to the output interface through a live data pipeline. However, in some instances it may be desirable forward data over a stale data pipeline in addition to, or instead of forwarding data through the live data pipeline.

As one example, transactions can be sent from non-volatile storage through a stale data pipeline to compensate for any of various possible system instabilities, which could compromise a data forwarders ability to send the transactions through a live data pipeline and/or the ability of a destination node to receive the transactions by way of a live data pipeline. A particular instance of system instability could be a system crash where the transactions are lost by volatile memory in an in-memory data path of a live data pipeline. As another example, even where transactions are sent to a destination node through the in-memory data path, it may be desirable for the transactions to be resent, in various instances. A particular instance could be where a data forwarder is receiving transactions faster than they are being sent as real-time or live data. Thus, in accordance with aspects of the present disclosure, significant flexibility is provided for the sending of transactions.

In some aspects of the present disclosure, a live data buffer in an in-memory data path of a live data pipeline can be filled with transactions. The live data buffer is typically filled with live transaction data. Live transaction data, as described herein, corresponds to real-time or live data of one or more transactions. The real-time or live data typically has remained in-memory (e.g. on an in-memory data path of a live data pipeline) since being received by an input interface of a data forwarder. In contrast, stale transaction data corresponds to stale data (e.g. non-real time or non-live data) of one or more transactions. The stale data is from non-volatile memory, or otherwise fails to meet criteria of live transaction data.

To send transactions to an output interface, at least some of the transactions can be pulled, pushed, or otherwise taken from a filled live data buffer. The live data buffer can be filled up to or below a limit. The limit could correspond to a physical limit of memory or an allocated limit of the memory. The limit may correspond to a number of transactions and/or to a quantity of data. As a specific example, the limit could be 20,000 transactions.

A stale data buffer can also be filled with transactions. The stale data buffer is typically filled with stale transaction data, for example, from a transaction log. To send transactions to an output interface, at least some of the transactions can be pulled, pushed, or otherwise taken from a filled stale data buffer. As with a live data buffer, a stale data buffer can be filled up to a limit, which could correspond to a physical limit of memory or an allocated limit of the memory. The limit may correspond to a number of transactions and/or to a quantity of data. As a specific example, the limit could be 20,000 transactions. A limit for a stale data buffer could be the same as or different from a limit for a live data buffer.

In certain respects, transactions can be pulled from a filled live data buffer in response to a pull request, corresponding to a live data buffer, being received by a data forwarder, for example, from a destination node. The pull request can optionally be for a number of transactions and/or for a quantity of data, which may be specified by the pull request or set by the data forwarder. The number of transactions and/or the quantity of data included in a response to the pull request may optionally correspond to a limit for the live data buffer as described above, or may be below a limit.

Similarly, transactions can be pulled from a filled stale data buffer in response to a pull request, corresponding to a stale data buffer, being received by a data forwarder, for example, from a destination node. The pull request can optionally be for a number of transactions and/or for a quantity of data, which may be specified by the pull request or set by the data forwarder. The number of transactions and/or the quantity of data included in a response to the pull request may optionally correspond to a limit for the stale data buffer as described above, or may be below a limit.

In some implementations, a pull request, corresponding to one data buffer, is for a number of transactions and/or for a quantity of data and the filled data buffer does not include enough transactions to fulfill those requirements for the pull request (as specified by the pull request and/or the data forwarder). In this case, additional transactions from another data buffer can be included in a response to the pull request. For example, where the pull request corresponds to the live data buffer, the additional transactions can be from the stale data buffer. The additional transactions may be such that the total transactions included in the response to the pull request meet or are still below the aforementioned number of transactions and/or for the quantity of data.

In this way, responses to pull requests can fill available headroom for responding to the pull requests with stale transaction data that may be available in a data forwarder. This can be utilized, for example, to prioritize the sending of live transaction data to an output interface of the data forwarder, while still including some stale transaction data, as headroom permits. Headroom may exist, for example, where responses to pull requests are sent faster than new transactions are being received by an input interface of the data forwarder and/or the live data buffer.

In accordance with additional aspects of the present disclosure, transactions from the input interface can be stored in a transaction log on non-volatile storage, such as disk based storage. Furthermore, entries corresponding to the transactions can be removed from the transaction log based receiving one or more acknowledgments corresponding to the transactions, for example, from a destination node.

In some cases, sent transactions can be logged in an acknowledgment log based receiving one or more acknowledgments corresponding to the transactions, for example, from a destination node. The acknowledgment log can be compared to the transaction log. Entries corresponding to the transactions can be removed from the transaction log and the acknowledgment log based on matches between transaction entries being in the acknowledgment and transaction logs. In some respects, at least some of the comparing and removing can be performed periodically, at designated times, or otherwise have variable timing.

Turning now to FIG. 1, a diagram is provided illustrating an exemplary system 100 in which some implementations of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, system 100 includes one or more source nodes, such as sources nodes 102a through 102n, one or more destination nodes, such as destination nodes 104a through 104n, and data forwarder 106. It should be understood that system 100 shown in FIG. 1 is an example of one suitable computing system. Each of the components shown in FIG. 1 may be implemented utilizing any type of computing device, such as computing device 400, later described with reference to FIG. 4, for example. Source nodes, destination nodes, and the data forwarder may communicate with each other via a network, which may include, without limitation, one or more local area networks (LANs) and/or wide area networks (WANs). Such networking environments are commonplace in offices, enterprise-wide computer networks, intranets, cellular networks, and the Internet.

Source nodes, destination nodes, and the data forwarder may each comprise a single device or multiple devices cooperating in a distributed computing system. For instance, data forwarder 106 may be provided via multiple devices arranged in a distributed computing system that collectively provide the functionality described herein. Additionally, other components not shown may also be included within the distributed computing system.

A source node can correspond to a computing system from which data forwarder 106 receives transactions. A destination node can correspond to a computing system to which data forwarder 106 provides transactions. Transactions can correspond to representations of received data that are to be forwarded by a data forwarder. In some implementations, the same computing system can act as both a source node and a destination node with respect to different transactions.

A source or destination node might take on a variety of forms, such as a personal computer (PC), a laptop computer, a mobile phone, a smartphone, a smartwatch, a tablet computer, a wearable computer, a personal digital assistant (PDA), a server, a sensor device, an MP3 player, a global positioning system (GPS) device, a video player, a handheld communications device, a workstation, a distributed computing system, a cloud computing system, a combination of these delineated devices, or any other suitable device.

In FIG. 1, source nodes 102a through 102n each correspond to a single device, such as a mobile device and/or an Internet of Things (IoT) device. Data forwarder 106 can correspond to an intermediate network node that may be employed to communicate data between one of sources nodes 102a through 102n and at least one of destination nodes 104a through 104n. Destination nodes 104a through 104n can each be distributed computing systems, for example.

In the implementation shown, data forwarder 106 includes interface component 108. Interface component 108 comprises input interface 108a and output interface 108b. Interface component 108 is configured to manage input and output (I/O) for data forwarder 106.

Input interface 108a is utilized by data forwarder 106 to receive transactions, for example, from any of source nodes 102a through 102n. Each transaction may correspond to data from a source node. The data can be provided to input interface 108a in any of a variety of possible formats, which can optionally be repackaged and/or otherwise modified to provide the transactions to data forwarder 106. In some cases, input interface 108a receives data in communications from source nodes and asynchronously acknowledges the receipt to the source nodes. This can be accomplished by any suitable acknowledgment, such as a close connection communication. No acknowledgment may be recorded where the connection times out.

Output interface 108b is utilized by data forwarder 106 to send transactions, for example, to any of destination nodes 104a through 104n. As described above, each transaction may correspond to data from a source node. Transactions can be sent using output interface 108b in any of a variety of possible formats to send the transactions to at least one of destination nodes 104a through 104n. In some implementations, a group of transactions is sent, for example, in a response to a pull request received by interface component 108 of data forwarder 106. The group of transactions may be sent in a response to the pull request to, for example, one or more of destination nodes 104a through 104n, which may or may not have made the pull request. In some implementations, the response to the pull request is sent to the destination node that made the pull request based on the pull request being from that destination node.

In a specific example, input interface 108a and output interface 108b are each HyperText Transfer Protocol (HTTP) interfaces. Data received by input interface 108a from any of source nodes 102a through 102n can be in HTTP POST requests comprising a Uniform Resource Identifier (URI). The URI may optionally identify at least one of destination nodes 104a through 104n as a destination for the data. Furthermore, output interface 108b may send the data to at least one of destination nodes 104a through 104n based on that identifying information. However, in other instances, the URI does not include the identifying information and/or the sending is not based on the identifying information. For example, as indicated above, the data may be sent to a destination node based on that destination node making a pull request.

Data forwarder 106 is shown as including in-memory data path 120 of a live data pipeline. An in-memory data path can be a communication path for data received by a data forwarder that does not include reading the data from disk based storage, or optionally from any other type of non-volatile storage. Transactions can be received via input interface 108a of in-memory data path 120 that comprises live data buffer 114. In-memory data path 120 is between input interface 108a and output interface 108b of data forwarder 106. In-memory data path 120 allows for transactions to be quickly received from source nodes 102a through 102n by data forwarder 106 and sent to destination nodes 104a through 104n from data forwarder 106 without the substantial costs that are commonly associated with reading the transactions from disk or non-volatile storage.

Transactions from input interface 108a are still stored on non-volatile storage in association with transaction log 112. Storing the transactions on the non-volatile storage in this manner can allow for at least some of the transactions to be sent to output interface 108b, through stale data buffer 116, from the non-volatile storage, through a stale data pipeline. For example, where transaction log 112 stores stale transaction data, the stale transaction data can be provided on stale data path 122 of the stale data pipeline. Stale data path 122 comprises stale data buffer 116 and is between the non-volatile storage and output interface 108b.

In some implementations, stale data buffer 116 corresponds to a stale data pipeline, and comprises a stale data queue. Although one stale data queue is included in data forwarder 106, other implementations may employ multiple stale data queues. The multiple stale data queues can be part of stale data buffer 116 and can operate in parallel.

It may typically be more desirable to send transactions to output interface 108b through in-memory data path 120 of the live data pipeline. However, in some instances, it may be desirable to send transactions to output interface 108b from the non-volatile storage over a stale data pipeline in addition to, or instead of, sending transactions to output interface 108b through in-memory data path 120 over the live data pipeline. For example, doing so can prevent loss of transaction data due to various system instabilities in the data forwarder and/or in a destination node for transactions. In this respect, transaction engine 126 can direct transaction logger 110 to provide stale transaction data to stale data buffer 116 on stale data path 122 of the stale data pipeline.

A potential system instability that may occur is transaction logger 110 pushing transaction data to live data buffer 114 faster than live data buffer 114 can store the pushed transaction data, resulting in the transaction data being dropped. Another potential system instability is data forwarder 106 crashing, such that transaction data in live data buffer 114, stale data buffer 116, and/or elsewhere, is lost. A further potential system instability is a destination node that is sent transaction data crashing, such that the destination node is prevented from successfully receiving the transaction data. These and other system instabilities can prevent transactions from being successfully received by a destination node as live transaction data. However, the transactions can later be received by the destination node as stale transaction data, for example, by using stale data path 122.

In data forwarder 106, transaction logger 110 receives transactions from input interface 108a. Transaction logger 110 can assign a transaction identifier (ID), such as a Universally Unique Identifier (UUID), to each received transaction. A transaction identifier can uniquely identify a transaction in data forwarder 106. Transaction logger 110 can additionally store transactions in transaction log 112 in association with corresponding transaction identifiers. In various implementations, a copy of each transaction received by transaction logger 110 is stored in transaction log 112 on non-volatile memory, such as a hard disk. The stored copy of a transaction can then be referred to as stale transaction data.

In data forwarder 106, input interface 108a can acknowledge receipt of data from a source node that corresponds to a transaction without waiting for a copy of the transaction to be stored to non-volatile memory by transaction logger 110. Thus, data forwarder 106 can provide an acknowledgment to the source node with low latency, where the acknowledgment may be sent prior to storage of a copy the transaction in transaction log 112.

Transaction logger 110 also pushes the received transactions to live data buffer 114 as live transaction data. In some cases, transaction logger 110 pushes all received transactions to live data buffer 114 as live transaction data. Transaction logger 110 may push the received transactions to live data buffer 114 in a First in First Out (FIFO) manner (i.e. in a sequence that the transactions were received), by way of example. In the present implementation, live data buffer 114 corresponds to a live data pipeline, and comprises a live data queue. Although one live data queue is included in data forwarder 106, other implementations may employ multiple live data queues. The multiple live data queues can be part of live data buffer 114 and can operate in parallel.

Live data buffer 114 stores at least some of the transactions that are pushed to live data buffer 114 by transaction logger 110. In embodiments, the transactions are stored in association with the corresponding transaction identifiers in live data buffer 114. At least some of the transactions that are stored in live data buffer 114 eventually are sent to output interface 108b, where they can be provided to a destination node as live transaction data, via in-memory data path 120. However, as later described in additional detail, for various reasons, at least some transactions that are stored in live data buffer 114 may not be provided to the destination node as live transaction data, via in-memory data path 120. Those transactions may instead eventually be provided to the destination node as stale transaction data from transaction log 112, for example, via stale data path 122. Additionally, as described below, not all transactions that are pushed to live data buffer 114 are accepted and stored by live data buffer 114. These transactions also may be provided to output interface 108b as stale transaction data from transaction log 112, for example, over stale data path 122.

Live data buffer 114 may not accept and store transactions from transaction logger 110 for any of a variety of reasons. In the present implementation, transactions that are accepted and stored by live data buffer 114 fill live data buffer 114. However, live data buffer 114 has a limit that controls how many transactions can be stored therein at any given time. In some embodiments, the limit is defined as a number of transactions, such as 20,000 transactions. However, as described previously, the limit could be defined in other ways and also could be subject to other variables. Thus, live data buffer 114 may not accept and store one or more transactions when live data buffer 114 has been filled up to a limit. Instead, the one or more transactions may be dropped as live transaction data, and may later be sent to output interface 108b as stale transaction data using the copy of the transaction stored in transaction log 112.

An exemplary situation that may arise to result in live data buffer 114 having been filled up to a limit is where data forwarder 106 is receiving transactions faster than the transactions can be sent through in-memory data pathway 120 and/or the live data pipeline. For example, transaction logger 110 may be pushing transactions to live data buffer 114 faster than live data buffer 114 can send transactions to output interface 108b to create space for the pushed transactions. Thus, the pushed transactions may be dropped as live transaction data. However, in accordance with various aspects of the present disclosure, the pushed transactions may later be sent as stale transaction data over stale data path 122.

Live data buffer 114 can send transactions to output interface 108b in response to a pull request being received by interface component 108 of data forwarder 106. Pull requests can be for a number of transactions (e.g. as specified by the request or determined by data forwarder 106). For example, a pull request can specify a number of transactions requested for a response to the pull request. Thus, the number of transactions could vary between pull requests. If live data buffer 114 is filled with at least the number of transactions being requested, a response to the pull request that is provided using output interface 108b can include that number of transactions from live data buffer 114. If live data buffer 114 is filled with more than the number of transactions being requested, transactions may remain in live data buffer 114 for a subsequent pull request. Where transactions remain, those transactions may be pushed forward in the live data queue of the present implementation (i.e. live data buffer 114), as transaction logger 110 pushes additional transactions to live data buffer 114.

Optionally, the remaining transactions could be removed and/or deallocated from live data buffer 114. An example of the remaining transactions optionally being removed and/or deallocated from live data buffer 114 is where transaction engine 126 empties all transactions from live data buffer 114, as is later described in additional detail below. These remaining transactions may later be sent to output interface 108b as stale transaction data.

Where live data buffer 114 is filled with less than the number of transactions being requested, in various implementations, the response to the pull request can include one or more transactions from another data buffer, and more particularly stale data buffer 116, in addition to the transactions from live data buffer 114. For example, transaction logger 110 may push the additional transactions to stale data buffer 116. The amount of transactions included from stale data buffer 116 can be such that the number of transactions (or more generically the limit) for the pull request is still not exceeded. Any transactions that may possibly remain in stale data buffer 116 can be treated in any of the various ways that has been described with respect to remaining transactions in live data buffer 114 (i.e. deallocated, removed, or eventually pushed forward by additional transactions).

Thus, from the forgoing, it will be appreciated that a response to a pull request can include a combination of live transaction data and stale transaction data. Furthermore, live transaction data from live data buffer 114 is generally prioritized over stale transaction data being included in a response to a pull request. In particular, in various implementations, the stale transaction data is included where there is headroom to reach a limit on the number of transactions in a response to a pull request. The headroom remains after including all available live transaction data from live data buffer 114 and/or the live data pipeline.

Thus, in some cases, transactions from stale data buffer 116 are utilized in a response to a pull request if the response is large enough to empty live data buffer 114. In this respect, destination nodes may increase the number of transaction being requested as appropriate so as to increase the likelihood that stale transaction data is acquired. Furthermore, in low traffic scenarios, where live data buffer 114 is not receiving transactions fast enough to be filled when responding to a pull request, headroom may typically be available to include at least some stale transaction data from stale buffer 116 in a response.

It is noted, however, that stale data buffer 116 may not necessarily include any transactions in the aforementioned scenarios. For example, the transactions may not have been stored in stale data buffer 116 when needed for a response to a pull request or no transactions may be available to store in stale data buffer 116. No transactions may be available, for example, where the throughput of data forwarder 106 has remained sufficiently high to send received transactions to destination nodes as live transaction data, and where the destination nodes are successfully receiving the transactions. In this case, transactions are quickly being forwarded by data forwarder 106 as live transaction data by way of the live data pipeline.

In accordance with additional aspects of the present disclosure, destination nodes that receive transaction data from data forwarder 106 can acknowledge the receipt of the data. Acknowledgments can correspond to stale transaction data and/or live transaction data. Acknowledgment logger 118 can log the acknowledgments in acknowledgment log 128. In logging an acknowledgment, acknowledgment logger 118 may store transactions with their associated transaction IDs, or may only store the associated transaction IDs. Thus, acknowledgment logger 118 can provide entries in acknowledgment log 128 that correspond to acknowledged transactions. In some instances, acknowledgment logger 118 and/or transaction engine 126 can modify entries in transaction log 112 based on the acknowledgments, such as by deleting corresponding entries therein. More particularly, the transactions may no longer be need by data forwarder 106 after they have been acknowledged, and therefore may be deleted based on corresponding acknowledgements. As illustrated, acknowledgment log 128 and transaction log 112 can correspond to separate logs. The separate logs are maintained in separate files. The separate files are each stored in non-volatile storage, such as on the same disk drive. It is noted that other configurations, such as a composite file for acknowledgements and transactions, are possible.

In some implementations, any of destination nodes 104a through 104n are configured to acknowledge receiving transactions from output interface 108b. For example, an acknowledgment can be sent based on receiving a response to a pull request. In some respects, an acknowledgment from a destination node can specify transaction identifiers of transactions that were received by the destination node. Acknowledgments of the specified transactions can be stored in acknowledgment log 128 by acknowledgment logger 118. In some implementations, an acknowledgment corresponds to a close connection communication, where the close connection communication corresponds to a response to a pull request. Based on the correspondence, acknowledgment logger 118 can determine which transactions to record as being acknowledged in acknowledgment log 128. In this way, acknowledgment logger 118 can synchronously record acknowledgments for transactions provided to destination nodes.

Accordingly, data forwarder 106 can log and store incoming transactions in transaction log 112 and further log ones of those transactions that have been acknowledged as being received by one or more destination nodes in acknowledgment log 128. Transaction engine 126 is configured to analyze transaction log 112 and/or acknowledgment log 128 for transaction management purposes. For example, transaction engine 126 can analyze transaction log 112 and acknowledgment log 128 for unacknowledged transactions, which may be sent to output interface 108b as stale transaction data over stale data path 122 through a stale data pipeline. Transaction engine 126 can further determine which unacknowledged transactions to include in the stale data pipeline(s) and/or the order in which to include those transactions. Exemplary approaches to implementing this functionality is described below; however, many other approaches can be employed within the scope of the present disclosure.

In some respects, transaction engine 126 can direct transaction logger 110 to provide stale transaction data to stale data buffer 116 on stale data path 122. In doing so, transaction engine 126 may periodically execute various functions to fill stale data buffer 116 with stale transaction data. The transactions that are used to fill stale data buffer 116 can be unacknowledged transactions. Transaction engine 126 may identify each transaction as being an unacknowledged transaction where the transaction is in a transaction log, but does not have a corresponding recorded acknowledgment in an acknowledgment log. In some respects, transaction engine 126 may optionally take various steps to prevent duplicate data from being forwarded by data forwarder 106 as a consequence of this approach. For example, in some cases, transactions are still being logged by transaction logger 110 and acknowledgements are still being recorded by acknowledgement logger 118. The transaction and acknowledgement logs used by transaction engine 126 to discover unacknowledged transactions are closed to this new information so that this new information does not accidentally result in duplicate data being forwarded. Thus, this new information may be stored in newly recorded acknowledgement and transaction logs. Later, at least a portion of the transactions from the closed transaction and acknowledgment logs may be merged with the new transaction and acknowledgement logs (e.g. transactions that were not sent into the stale data pipeline).

An exemplary state machine is described below; however the described functionality could be implemented without a state machine. In a first state, transaction engine 126 is configured to direct transaction logger 110 to close the current transaction log 112 and open a new transaction log 112. Upon opening the new transaction log 112, new transactions received from input interface 108*a* may be stored in the new transaction log 112 in association with transaction identifiers, as transactions continue to be received by transaction logger 110. Closing the current transaction log 112 can simplify subsequent processing performed by transaction engine 126 (e.g. processing to identify and provide unacknowledged transactions to stale data buffer 116) by preventing additional transactions from being stored in the closed transaction log 112 during the processing that otherwise may need to be tracked, for example, so as to prevent duplicate data from being sent to output interface 108*b*. Opening the new transaction log 112 can allow transaction logger 110 to continue storing transactions as new live transaction data is received after closing the old transaction log 112.

Transaction engine 126 is further configured to direct acknowledgment logger 118 to close the current acknowledgment log 128 and open a new acknowledgment log 128. Upon opening the new acknowledgment log 128, new acknowledgments may be recorded in the new acknowledgment log 128, for example, by corresponding transaction identifiers, as acknowledgments continue to be received by interface component 108. As with transaction log 112, closing the current acknowledgment log 128 can simplify subsequent processing performed by transaction engine 126 (e.g. processing to identify and provide unacknowledged transactions to stale data buffer 116) by preventing additional acknowledgments from being stored in the closed acknowledgement log 128 during the processing that otherwise may need to be tracked, for example, so as to prevent duplicate data from being sent to output interface 108*b*. Opening the new acknowledgement log 128 can allow acknowledgement logger 118 to continue recording acknowledgments as they are received after closing the old acknowledgment log 128.

In a second state, transaction engine 126 is configured to empty all transactions from live data buffer 114 and stale data buffer 116, although it is noted that transactions may not necessarily be in at least one of live data buffer 114 and stale data buffer 116 to empty at this time. Emptying the transactions can correspond to deallocating the transactions and therefore does not necessarily require physically removing corresponding data from the data buffers. Emptying the transactions can be performed, for example, to simplify the process of preventing duplicate data from being sent to output interface 108*b*. For example, if those transactions remained, two copies of the same transaction might later be present in one or more of the data buffers and/or be sent to output interface 108*b*. In particular, there is a risk that transaction engine 126 directs transaction logger 110 to push those transactions to stale data buffer 116 as unacknowledged transactions, as those transactions would likely not be in the closed acknowledgement log 128. As an alternative, the transactions present in live data buffer 114 and/or stale data buffer 116 could be tracked and duplicate transactions could be blocked from being provided to stale data buffer 116.

In a third state, transaction engine 126 is configured to scan all available closed acknowledgment logs 128 and store all available acknowledged transaction identifiers in transaction engine memory (not shown). There optionally may be any number of closed acknowledgment logs 128, as an acknowledgement log 128 may be closed and a new log opened for various reasons, such as upon reboot, which could be performed after a crash. At this time, acknowledged transactions may optionally be deleted from the non-volatile storage. For example, transactions can be removed from transaction log 112 based on entries in acknowledgment log 128 corresponding to the transactions. In doing so, transaction log 112 may be compared to acknowledgment log 128 by way of the transaction engine memory.

In a fourth state, transaction engine 126 is configured to scan all available closed transaction logs 112 for unacknowledged transactions and direct replay or otherwise provide unacknowledged transactions to stale data buffer 116. This can include, for example, identifying the unacknowledged transactions as transactions in all available closed transaction logs that do not have a corresponding acknowledgment indicated in the transaction engine memory. It is noted that there optionally may be any number of closed transaction logs 112, as a transaction log 112 may be closed and a new log opened for various reasons, such as upon reboot, which could be performed after a crash. If a transaction in a closed transaction log does not have a corresponding transaction identifier in the transaction engine memory from the third state, transaction engine 126 can identify the transaction as unacknowledged. Unacknowledged transactions are recorded in unacknowledged transaction log 124 by corresponding transaction identifiers. If no unacknowledged transactions are available for unacknowledged transaction log 124, transaction engine 126 may exit the fourth state. Although unacknowledged transaction log 124 is distinctly shown, in some implementations, it may correspond to a modified version of one or more of the closed transaction logs 112.

Transaction logger 110 can send unacknowledged transactions to stale data buffer 116 as stale transaction data over stale data path 122, as directed by transaction engine 126. As transaction logger 110 receives the unacknowledged transactions, they can be logged by transaction logger 110 in the newly added transaction log 112. In accordance with embodiments, unacknowledged transactions are replayed, such that they are provided to stale data buffer 116 in the order they were originally received by transaction logger 110. However, the order could change based on various criteria. For example, in some cases at least one of destination nodes 104a through 104n could provide one or more configuration instructions that configure the order that unacknowledged transactions are provided to stale data buffer 116. Thus could be used, for example, where a destination node is seeking stale transaction data from a specified data range to prioritize in the sending to output interface 108b, as one specific example.

Transactions are stored in stale data buffer 116 where transactions therein may include the transaction's data and a corresponding transaction identifier. In some implementations, stale data buffer 116 stores as many of the unacknowledged transactions as can be fit therein up to a limit, similar to live data buffer 114. Thus, some unacknowledged transactions may not be stored if stale data buffer 116 is at the limit or capacity when received. In other cases, there may not be enough available unacknowledged transactions to fill stale data buffer 116 to the limit. In some cases, the limit is set to a number of transactions, such as 20,000 transactions.

Where the limit has been reached, transaction engine 126 may optionally pause and resume providing unacknowledged transactions to stale data buffer 116 over time while remaining in the fourth state. Transaction engine 126 may exit the fourth state based on no transaction entries remaining in unacknowledged transaction log 124.

Upon pausing, stale data buffer 116 may not be available for storing additional unacknowledged transactions. For example, stale data buffer 116 may be full and/or at its limit. However, upon resuming, stale data buffer 116 may be available for storing additional unacknowledged transactions. For example, while paused, stale data buffer 116 may have provided stored transactions to output interface 108b, thereby freeing up storage for additional unacknowledged transactions. This is because the various components of data forwarder 106, including transaction logger 110 and acknowledgment logger 118 are decoupled from one another, such that responses to pull requests can still be made while transaction engine 126 is operating.

In particular, transaction logger 110 and acknowledgment logger 118 can continue to operate using the aforementioned newly opened logs, whereas transaction engine 126 is basing its operation on older closed logs. In this respect, transaction engine 126 can remove transaction identifiers of unacknowledged transactions from unacknowledged transaction log 124 as the corresponding transactions are sent to stale data buffer 116 or based on stale data buffer 116 accepting the unacknowledged transactions.

Upon exiting the fourth state, the closed transaction and acknowledgment logs and/or unacknowledged transaction log 124 may be discarded. The state machine described above could be operated by transaction engine 126 periodically, such as every five minutes. In addition, or instead, operation of the state machine could be based on different factors, such as the amount of stale transaction data in non-volatile storage. As another example, the state machine could be operated based on a reboot of at least one component of data forwarder 106, which may be in response to a system crash. By operating the state machine, transaction engine 126 can provide resiliency to this and other system instabilities that otherwise could compromise the use of live transaction data in responding to pull requests.

Figure 2:
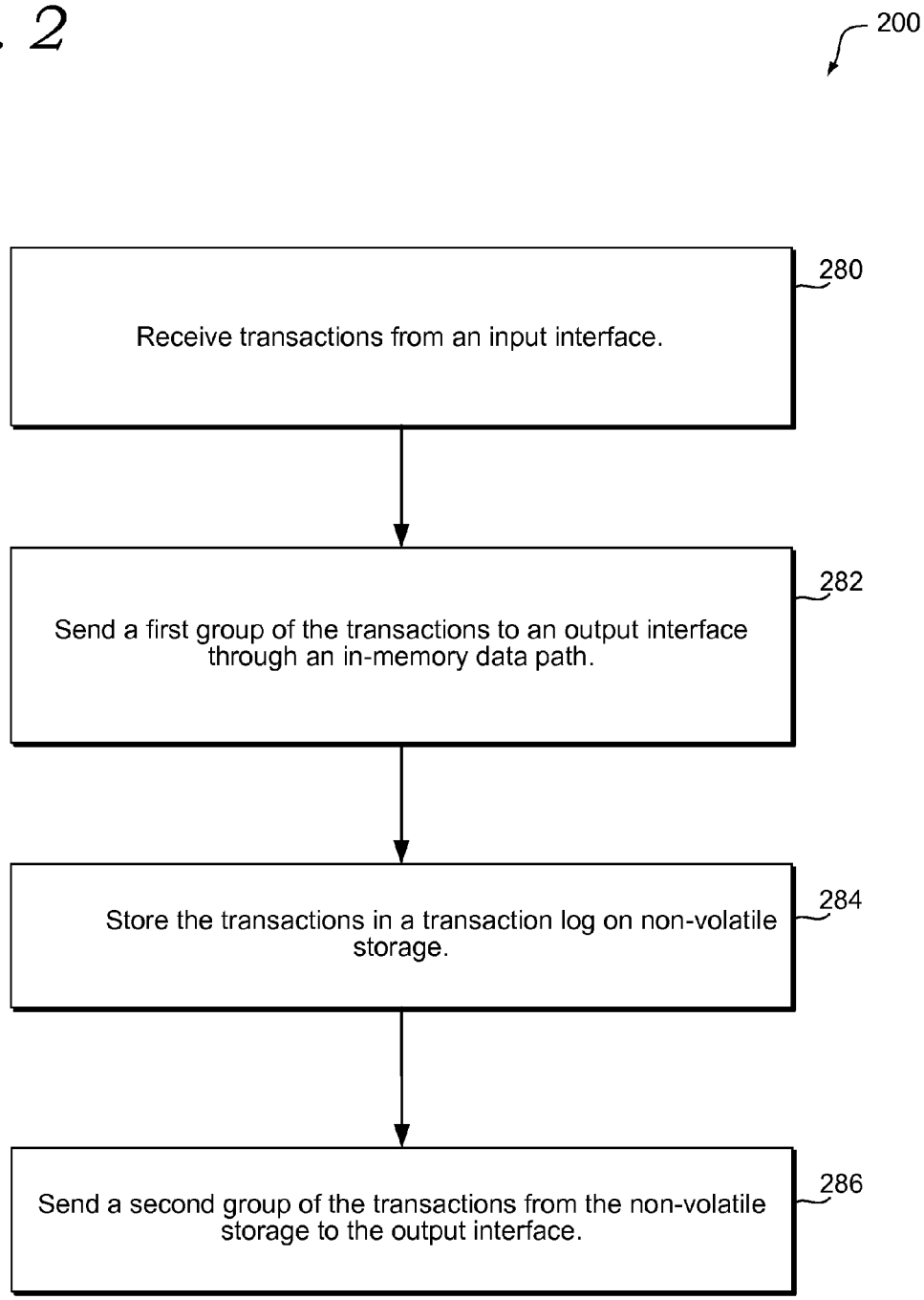
FIG. 2 depicts a flow diagram of an exemplary method for forwarding data in accordance with implementations of the present disclosure.

Referring now to FIG. 2 (and with reference to FIG. 1), FIG. 2 depicts a flow diagram of an exemplary method for forwarding data in accordance with implementations of the present disclosure. Each block of method 200 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 280, method 200 includes receiving transactions from input interface. For example, transaction logger 110 can receive transactions from input interface 108a of data forwarder 106. Input interface 108a is of in-memory data path 120, which includes live data buffer 114. In-memory data path 120 is between input interface 108a and output interface 108b of data forwarder 106. Transaction logger 110 can assign transaction identifiers to each of the transactions.

At block 282, method 200 includes sending a first group of transactions to an output interface through an in-memory data path. In the present example, a first group of the received transactions can be sent to output interface 108b through in-memory data path 120 as live transaction data. In particular, the first group of the received transactions can be pushed from transaction logger 110 to live data buffer 114 with their associated transaction IDs. Live data buffer 114 can store the pushed first group of transactions and well as other received transactions with their corresponding transaction IDs. Assume that interface component 108 of data forwarder 106 receives a pull request for 10,000 transactions from destination node 104a. Based on the pull request, 10,000 transactions are included in a response to the pull request that is sent to destination node 104a through output interface 108b. The first group of transactions is included in the 10,000 transactions. Thus, the first group of transactions has been quickly sent as live transaction data through in-memory data path 120.

At block 284, method 200 includes storing the transactions in a transaction log on non-volatile storage. In the current example, the received transactions described with respect to block 280 can be stored in transaction log 112 on non-volatile storage. The stored transactions may include transaction data and corresponding transaction IDs stored on disk.

At block 286, method 200 includes sending a second group of the transactions from the non-volatile storage to the output interface. Continuing with the present example, a second group of the received transactions can be sent from the non-volatile storage to output interface 108b. In accordance with embodiments described herein, the second group of transactions may have been previously been pushed to live data buffer 114. However, live data buffer 114 did not store the second group of transactions as a result of live data buffer 114 having stored therein a limit of transactions (e.g., 15,000 transaction). As such, the second group of transactions was dropped from the live data buffer.

Thus, in the current example, the second group of transactions did not have corresponding entries in acknowledgment log 128 when transaction engine 126 had closed acknowledgment log 128. This resulted in transaction engine 126 including the second group of transactions in unacknowledged transaction log 124. Transaction engine 126 replayed transactions in unacknowledged transaction log 124 (including the second group of transactions), by directing transaction logger 110 to send the replayed transactions to stale data buffer 116. Stale data buffer 116 stored the sent transactions (including the second group of transactions) therein with corresponding transaction IDs. Assume a pull request was received by interface component 108 from destination node 104a for 20,000 transactions. Based on the pull request, 15,000 transactions from live data buffer 114 were included in a response to the pull request. The response to the pull request also included 5,000 transactions from stale data buffer 116, which included the second group of transactions, to total 20,000 transactions. Thus, while the second group of transactions was not sent to output interface 108b as live transaction data, the second group of transactions was still eventually sent to output interface 108b as stale transaction data over stale data path 122. In this way, the second group of transactions was not lost even though they could not be sent over in-memory data path 120.

Figure 3:
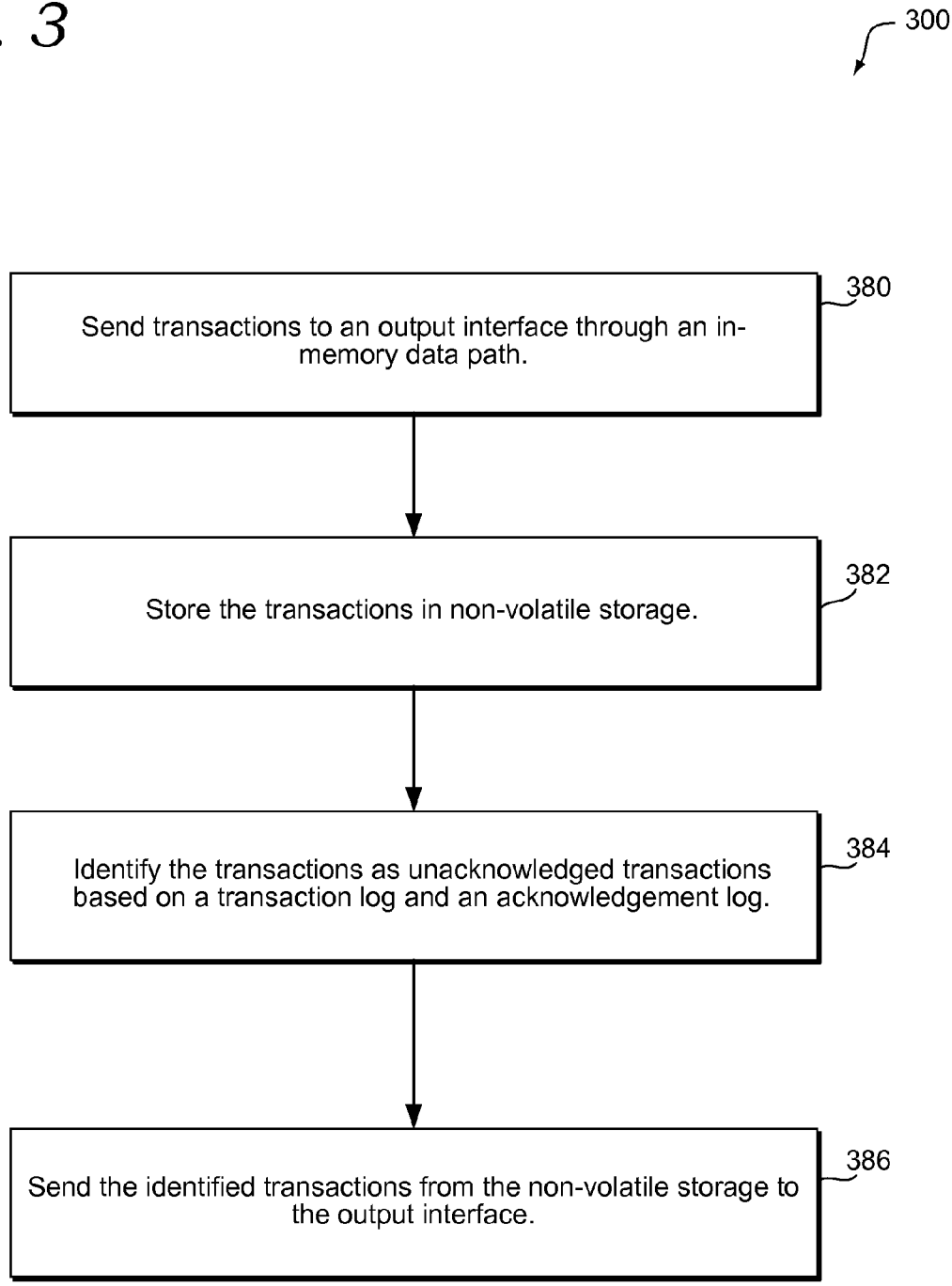
FIG. 3 depicts a flow diagram of another exemplary method for forwarding data in accordance with implementations of the present disclosure.

Referring now to FIG. 3 (and with reference to FIG. 1), FIG. 3 depicts another flow diagram of an exemplary method for forwarding data in accordance with implementations of the present disclosure.

At block 380, method 300 includes sending transactions to an output interface through an in-memory data path. For example, the transactions can be sent to output interface 108b through in-memory data path 120 of the live data pipeline. In such a case, the transactions were received by transaction logger 110 and subsequently sent by transaction logger 110 to live data buffer 114. Assume live data buffer 114 stored the 5,000 transactions amongst other transactions to total 10,000 transactions. Assume further that the 5,000 transactions were then sent to destination node 104n in a response to a pull request from destination node 104n. Further assume that the pull request did not include a requested or specified number of transactions or otherwise indicate how many transactions to be included in the pull request. The response to the pull request included all 10,000 transactions, which may be the default number of transactions to be included in a response to a pull request from destination node 104n. In this way, the transactions were sent to destination node 104n as live transaction data.

At block 382, method 300 includes storing the transactions in non-volatile storage. In the current example, the transactions were stored in transaction log 112 on non-volatile storage by transaction logger 110. As can be appreciated, the transaction logger 110 might not wait for the transactions to be stored before sending the transactions to live data buffer 114.

At block 384, method 300 includes identifying the transactions as unacknowledged based on a transaction log and an acknowledgment log. In the ongoing example, assume that although the transactions were sent to destination node 104n at block 380, destination node 104n crashed prior to receiving the transactions. As such, a time out resulted and the transactions were never acknowledged by destination node 104n. The transactions are identified by transaction engine 126 as being unacknowledged and are stored in unacknowledged transaction log 124. Such transactions may be identified by comparing transaction log 112 to acknowledgment log 128 (e.g. closed logs). Acknowledgment log 128 may first have been loaded into transaction engine memory for the comparison. Transactions appearing in transaction log 112, but not appearing in acknowledgment log 128 can therefore be identified as unacknowledged.

At block 386, method 300 includes sending the identified transactions from the non-volatile storage to the output interface. Continuing with the example, the identified transactions from block 384 are sent from the non-volatile storage to output interface 108b. In particular, the identified transactions are sent over stale data path 122 of the stale data pipeline. The identified transactions are sent to destination node 104n in a response to a pull request from destination node 104n for a default number of transactions. Assume that live data buffer 114 only included 8,000 transactions for the response, where the identified transactions were included in the response with 2,000 transactions from stale data buffer 116 to total 10,000 transactions. Further assume that destination node 104n had recovered from the aforementioned crash, and therefore was able to retrieve the identified transactions in the response and acknowledge receipt of the response. Thus, destination node 104n was able to subsequently retrieve the identified transactions as stale transaction data despite the crash that resulted in loss of the live transaction data.

Methods 200 and 300 have been described using specific examples for purposes of illustration. It will be appreciated that methods 200 and 300 applies to many scenarios beyond the specific examples provided.

Figure 4:
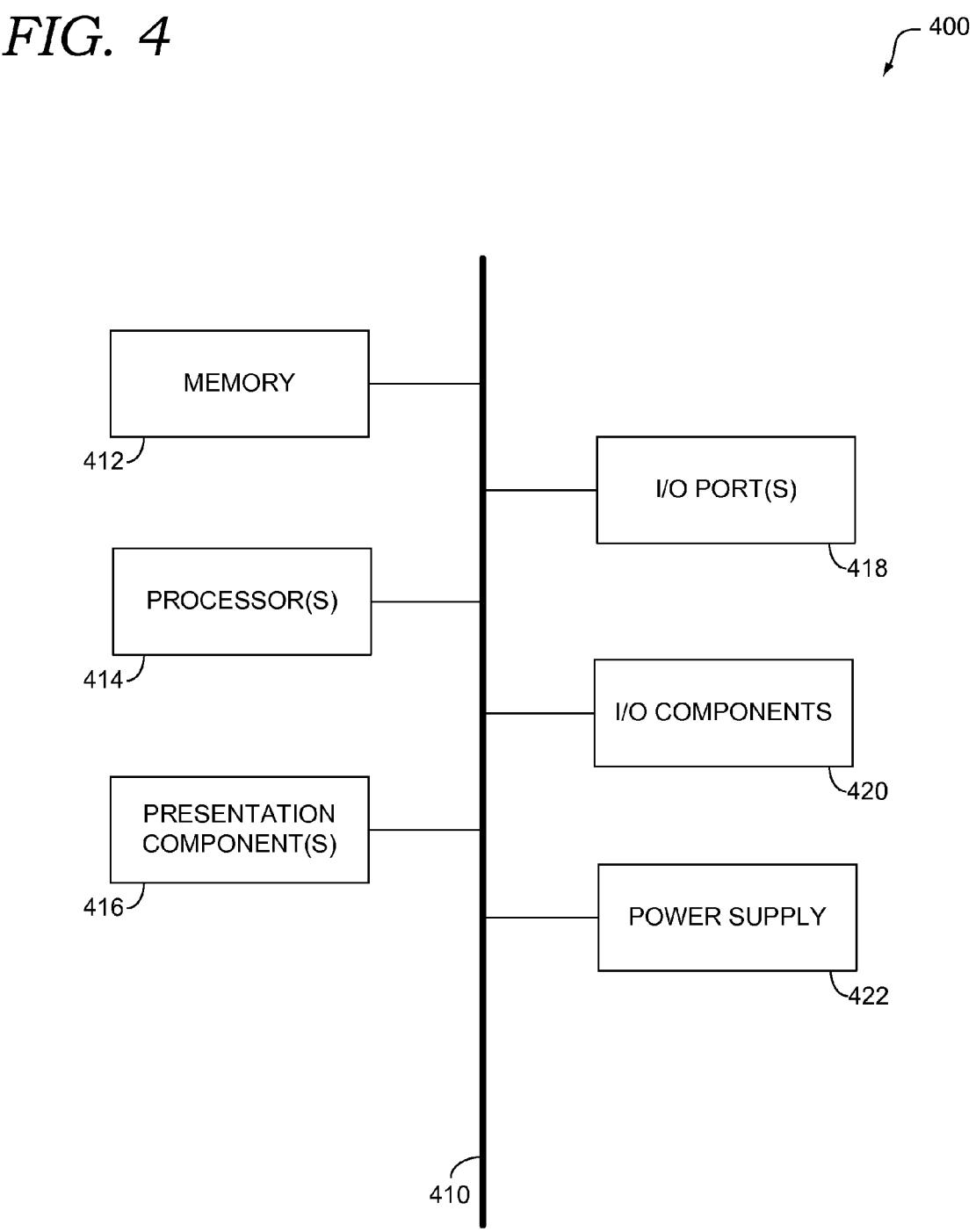
FIG. 4 is a diagram of an exemplary computing environment suitable for use in implementations of the present disclosure.

Having described implementations of the present disclosure, an exemplary operating environment in which embodiments of the present invention may be implemented is described below in order to provide a general context for various aspects of the present disclosure. Referring initially to FIG. 4 in particular, an exemplary operating environment for implementing embodiments of the present invention is shown and designated generally as computing device 400. Computing device 400 is but one example of a suitable computing environment and is not intended to suggest any limitation as to the scope of use or functionality of the invention. Neither should the computing device 400 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 4, computing device 400 includes bus 410 that directly or indirectly couples the following devices: memory 412, one or more processors 414, one or more presentation components 416, input/output (I/O) ports 418, input/output components 420, and illustrative power supply 422. Bus 410 represents what may be one or more busses (such as an address bus, data bus, or combination thereof). Although the various blocks of FIG. 4 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 4 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 4 and reference to "computing device."

Computing device 400 typically includes a variety of computer-readable media. Computer-readable media can be any available media that can be accessed by computing device 400 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 400. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 412 includes computer-storage media in the form of volatile and/or nonvolatile memory. The memory may be removable, non-removable, or a combination thereof. Exemplary hardware devices include solid-state memory, hard drives, optical-disc drives, etc. Computing device 400 includes one or more processors that read data from various entities such as memory 412 or I/O components 420. Presentation component(s) 416 present data indications to a user or other device. Exemplary presentation components include a display device, speaker, printing component, vibrating component, etc.

I/O ports 418 allow computing device 400 to be logically coupled to other devices including I/O components 420, some of which may be built in. Illustrative components include a microphone, joystick, game pad, satellite dish, scanner, printer, wireless device, etc. The I/O components 420 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 400. The computing device 400 may be equipped with depth cameras, such as, stereoscopic camera systems, infrared camera systems, RGB camera systems, and combinations of these for gesture detection and recognition. Additionally, the computing device 400 may be equipped with accelerometers or gyroscopes that enable detection of motion.

As can be understood, implementations of the present disclosure provide for various approaches to data forwarding. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The invention claimed is:

1. A computer-implemented method comprising:
generating, at a data forwarder, a backup of live data received by the data forwarder while the live data is provided to a real-time data pipeline for forwarding from the data forwarder;
recovering a first portion of the live data from the backup to a stale data pipeline of the data forwarder;
receiving, by the data forwarder, a request to forward the live data to a destination node; and
forwarding data to the destination node in response to the request, wherein the first portion of the live data from the stale data pipeline is added to a second portion of the live data from the real-time data pipeline in the response based on determining headroom remains to reach an amount of the data identified to include in the response.

2. The computer-implemented method of claim 1, wherein the request is a pull request from the destination node.

3. The computer-implemented method of claim 1, wherein the recovered first portion is included in the response based on a data buffer of the real-time data pipeline including less than the amount of the data identified to include in the response.

4. The computer-implemented method of claim 1, wherein the amount of data is requested by the destination node.

5. The computer-implemented method of claim 1, wherein the amount of data is a number of transactions specified in the request.

6. The computer-implemented method of claim 1, wherein the first portion of the live data from the stale data pipeline is selected to match the amount of the data identified to include in the response, the amount of data specified in the request.

7. The computer-implemented method of claim 1, wherein the first portion of the live data from the stale data pipeline is included in the response based on the data forwarder responding to pull requests faster than new live data is received by an input interface of the data forwarder.

8. The computer-implemented method of claim 1, wherein the backup of the received live data is on non-volatile storage, and the real-time data pipeline uses only volatile storage.

9. The computer-implemented method of claim 1, wherein the first portion of the live data is included in the response based on being dropped from the real-time data pipeline.

10. The computer-implemented method of claim 1, wherein the first portion of the live data is dropped from the real-time data pipeline based on the real-time data pipeline being at a capacity.

11. The computer-implemented method of claim 1, further comprising logging one or more acknowledgments of the first portion of the live data, the one or more acknowledgements being received by the data forwarder based on the forwarding.

12. The computer-implemented method of claim 1, wherein the first portion of the live data is included in the response based on a comparison between the backup of the live data and one or more acknowledgments of at least some of the live data, the one or more acknowledgements received at the data forwarder.

13. The computer-implemented method of claim 1, after the forwarding of the first portion of the live data and based on determining the first portion of the live data is unacknowledged, recovering the first portion of the live data from the backup to the stale data pipeline for additional forwarding.

14. The computer-implemented method of claim 1, further comprising removing the first portion of the live data from the backup based on receiving an acknowledgement in response to the forwarding.

15. The computer-implemented method of claim 1, wherein the recovering of the first portion of the live data from the backup comprises:
 closing a transaction log in the backup of the live data;
 opening a new transaction log for the backup for subsequently received live data;
 retrieving the first portion of the live data from the closed transaction log; and
 generating the backup of the subsequently received live data in the new transaction log.

16. The computer-implemented method of claim 1, wherein the real-time data pipeline comprises a live data queue and the stale data pipeline comprises a stale data queue.

17. The computer-implemented method of claim 1, wherein the backup comprises transactions and transaction identifiers corresponding to the live data.

18. The computer-implemented method of claim 1, further comprising:
 receiving an acknowledgement in response to the forwarding; and
 recording the received acknowledgement in an acknowledgement log.

19. The computer-implemented method of claim 1, wherein the recovering of the first portion of the live data from the backup comprises:
 closing an acknowledgement log comprising recorded acknowledgments of forwarded data;
 opening a new acknowledgement log for recording subsequent acknowledgments of forwarded data;
 identifying the first portion in the backup based on a comparison between the closed acknowledgment log and the backup; and
 recording the subsequent acknowledgments in the new acknowledgment log.

20. The computer-implemented method of claim 1, wherein the live data is received by the data forwarder from a source node in a plurality of network communications, and the response is forwarded to the destination node over one or more network communications.

21. A system for forwarding data, the system comprising:
 one or more data processors; and
 one or more computer-readable storage media containing instructions which when executed on the one or more data processors, cause the one or more processors to perform operations including:
 generating, at a data forwarder, a backup of live data received by the data forwarder while the live data is provided to a real-time data pipeline for forwarding from the data forwarder;
 recovering a first portion of the live data from the backup to a stale data pipeline of the data forwarder;
 receiving, by the data forwarder, a request to forward the live data to a destination node; and
 forwarding data to the destination node in response to the request, wherein the first portion of the live data from the stale data pipeline is added to a second portion of the live data from the real-time data pipeline in the response based on determining headroom remains to reach an amount of the data identified to include in the response.

22. The system of claim 21, wherein the request is a pull request from the destination node.

23. The system of claim 21, wherein the recovered first portion is included in the response based on a data buffer of the real-time data pipeline including less than the amount of the data identified to include in the response.

24. The system of claim 21, wherein the amount of data is requested by the destination node.

25. The system of claim 21, wherein the amount of data is a number of transactions specified in the request.

26. The system of claim 21, wherein the first portion of the live data from the stale data pipeline is selected to match the amount of the data identified to include in the response, the amount of data specified in the request.

27. One or more non-transitory computer-storage media storing computer-useable instructions that, when executed by a computing device, perform a method for forwarding data, the method comprising:
 generating, at a data forwarder, a backup of live data received by the data forwarder while the live data is provided to a real-time data pipeline for forwarding from the data forwarder;
 recovering a first portion of the live data from the backup to a stale data pipeline of the data forwarder;
 receiving, by the data forwarder, a request to forward the live data to a destination node; and
 forwarding data to the destination node in response to the request, wherein the first portion of the live data from the stale data pipeline is added to a second portion of the live data from the real-time data pipeline in the response based on determining headroom remains to reach an amount of the data identified to include in the response.

28. The computer-storage media of claim 27, wherein the request is a pull request from the destination node.

29. The computer-storage media of claim 27, wherein the recovered first portion is included in the response based on a data buffer of the real-time data pipeline including less than the amount of the data identified to include in the response.

30. The computer-storage media of claim 27, wherein the amount of data is requested by the destination node.

* * * * *